United States Patent [19]

Sinhuber

[11] Patent Number: 5,333,680
[45] Date of Patent: Aug. 2, 1994

[54] COOLING SYSTEM FOR THE CHAMBER OF A GENERATOR/TRANSMISSION UNIT

[75] Inventor: Franz Sinhuber, Vienna, Austria
[73] Assignee: Elin Energieversorgung GmbH, Vienna, Austria
[21] Appl. No.: 127,474
[22] Filed: Sep. 28, 1993

Related U.S. Application Data

[63] Continuation of Ser. No. 659,299, filed as PCT/AT89/00100, Nov. 7, 1989

[30] Foreign Application Priority Data

Nov. 10, 1988 [AT]  Austria .................. 2759/88

[51] Int. Cl.⁵ .............. F01D 5/08; F03B 13/08; F03B 13/10; H02K 9/12
[52] U.S. Cl. .................. 165/47; 165/170; 290/52; 290/54; 310/54; 310/59; 415/175; 417/367
[58] Field of Search ............ 290/1 R, 52, 54; 165/170, 47; 417/366, 367; 415/175; 310/53, 54, 59

[56] References Cited

U.S. PATENT DOCUMENTS

| | | | |
|---|---|---|---|
| 1,774,860 | 9/1930 | Wendler et al. | 165/170 |
| 1,851,881 | 3/1932 | Watt | 165/170 |
| 2,862,120 | 11/1958 | Onsrud . | |
| 3,055,642 | 9/1962 | Cox et al. | 165/170 |
| 3,936,681 | 2/1976 | Liebe . | |
| 4,308,464 | 12/1981 | Yamamoto | 290/52 |
| 4,445,046 | 4/1984 | Allegre et al. | 290/54 |

FOREIGN PATENT DOCUMENTS

| | | | |
|---|---|---|---|
| 531328 | 10/1956 | Canada | 290/52 |
| 748113 | 10/1944 | Fed. Rep. of Germany . | |
| 1022783 | 3/1953 | France . | |
| 1129191 | 1/1957 | France . | |
| 1267170 | 6/1961 | France . | |
| 1295782 | 5/1962 | France | 290/52 |
| 2209240 | 6/1974 | France . | |
| 315990 | 10/1956 | Switzerland . | |
| 425888 | 3/1935 | United Kingdom | 290/52 |
| 1016203 | 1/1966 | United Kingdom | 290/52 |

OTHER PUBLICATIONS

"The First Generators in Switzerland Driven Direct by Bulb Turbines" A. G. Lalive d'Epinay Brown Boveri Rev. No. 4, vol. 57, (1970).

*Primary Examiner*—John K. Ford
*Attorney, Agent, or Firm*—Sandler Greenblum & Bernstein

[57] ABSTRACT

A cooling system for a generator is provided with a primary coolant loop containing a primary coolant for cooling the generator, and a secondary coolant loop provided with a secondary coolant medium for cooling the primary coolant loop in a heat exchanger. The secondary coolant is cooled in radiators formed in the wall of the chamber. The cooling system also has a transmission and a turbine, and is positioned in a chamber and is surrounded by running water.

12 Claims, 2 Drawing Sheets

COOLING SYSTEM FOR THE CHAMBER OF A GENERATOR/TRANSMISSION UNIT

This application is a continuation of application Ser. No. 07/659,299, filed Jun. 11, 1991, which is the U.S. National Phase of PCT/AT89/00100, filed Nov. 11, 1989, now abandoned.

BACKGROUND OF THE INVENTION

1. Field of the Invention

The invention relates to a cooling system for a generator, disposed in a chamber surrounded with running water, having a turbine; a transmission is preferably provided between the generator and the turbine.

2. Background and Relevant Information

Until now, the cooling air of the generator, which may also be under overpressure, was used directly as a heat transfer medium for removing the lost heat. Earlier versions provide single- or multi-stage blowers, among other means. The heat transmission coefficient can thus be increased so as to be adequate for the heat exchange.

The disadvantage of this arrangement is that the induced ventilation, with fans on the generator motor, is no longer adequate to overcome the resistance in these airways. Additional fans are thus needed, which already draw considerable power and are quite noisy. If this fan is built into the chamber, operation must be interrupted if the fan fails.

Another disadvantage is that only a very rough and incomplete adaption of the quantity of cooling air to the particular power loss of the generator under partial load and to the ambient temperature between summer and winter is attainable with reversible-speed fan motors and flap systems for carrying air. From the standpoint of servicing, it is also disadvantageous that in cases where the fan is disposed in the chamber, workers have to enter the high-pressure air flow.

French Patent 1267170 discloses a tubular turbine generator, the housing dome of which is embodied as a heat exchanger. However, tubular turbine systems of this kind are not worth considering until above a certain power level, which is approximately 10 MVA.

Cooling the machine directly with running water has also been attempted. However, this process is no longer possible for technical reasons, because it causes such severe water pollution.

SUMMARY OF THE INVENTION

The object of the invention is to create a cooling system, of the type referred to at the outset above, which on the one hand overcomes the above disadvantages and on the other can be used in systems that have mass-produced compressor drums of the kind found in medium-sized mass-produced machines.

The cooling system according to the invention is characterized in that the medium of a primary coolant loop that cools the generator can be re-cooled in suitable heat exchangers of the secondary coolant loop, and the medium of the secondary coolant loop can be cooled in cooling radiators that are formed by the preferably metal chamber wall.

The invention makes it possible for the first time to manufacture submersible systems that are economically justifiable even in relatively low power ranges. This is due above all to the fact that generators practically straight from mass production can be used. In all cases of customized manufacture, the engineering effort and hence the financial cost are so high that the system is no longer commercially viable. The cooling system according to the invention now makes it possible to use such mass-produced products for the above-described systems. The advantage of the system of the invention is above all that the sum of the pump outputs and the higher power of the induced ventilation systems entails smaller overall losses than with the high-pressure fans previously used.

In a particular characteristic of the invention, the heat exchangers are on the one hand air/water coolers for cooling the generator air, and on the other hand oil/water coolers for cooling the bearing oil or transmission oil.

Previously, it was necessary to separate the oil cooling and the air cooling. That is, a provision had to be made for re-cooling the oil, and separately from this, care had to be taken to re-cool the air. The invention makes it possible for the respective heat exchangers to act on the joint secondary coolant loop.

In a feature of the invention, the chamber wall, flushed on the outside directly by running water and comprising a sheet-metal jacket, has vertical or horizontal conduit-like cooling pockets on the side of the generator. This assures that the resultant lost heat is reliably carried away. Moreover, the coolant can be recirculated in a closed loop by pumps that require little power.

In another characteristic of the invention, the cooling pockets communicate on both sides via collecting conduits. Since such constructions can be made highly stable and robust, this simple embodiment has advantages in terms of its manufacture.

In another feature of the invention, the cooling pockets are formed by ribs, welded onto the chamber wall and closed off via a cover wall. With this kind of construction, the system can be manufactured with good welders, who nevertheless need not be highly skilled craftsmen. This keeps manufacturing costs within reasonable limits.

In a further embodiment of the invention, The cover wall has recesses, preferably bores, for fastening the cover wall to the ribs; the bores are filled with welding material by means of a welding process. This simple manufacturing process should also be viewed in the light of production costs, as already noted.

BRIEF DESCRIPTION OF THE DRAWINGS

The invention will now be described in further detail in terms of an exemplary embodiment shown in the drawing.

DETAILED DESCRIPTION OF THE INVENTION

Figure 1:
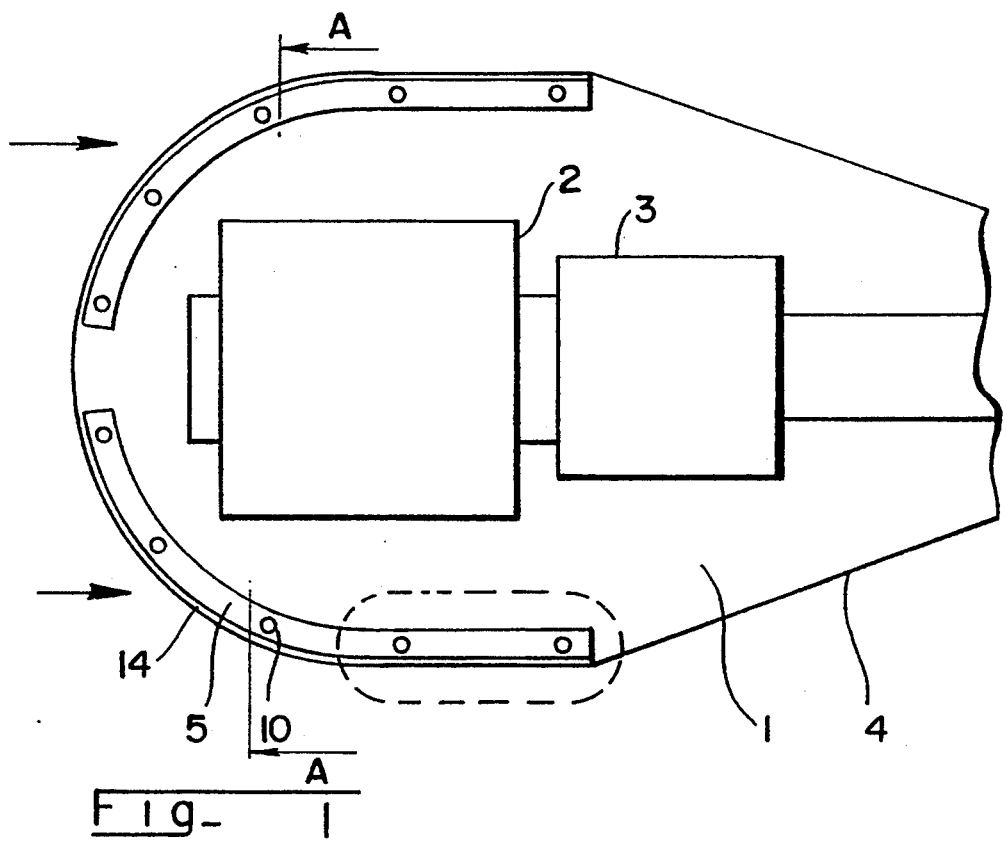
FIG. 1 is a schematic plan view on the chamber.

A generator 2 preceded by a transmission 3 is disposed in a chamber 1 surrounded by running water. The transmission 3 is driven by a low-speed turbine, not shown. The chamber wall 4 is formed by a sheet-metal jacket. In the direction in which the water flows, the chamber wall 4 is embodied as a cooling radiator 5.

Figure 2:
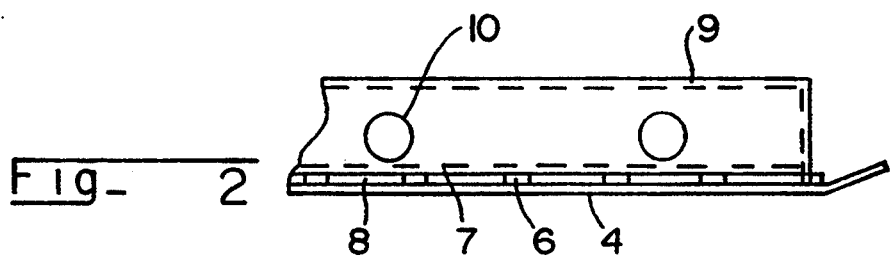
FIG. 2 shows the detail A of FIG. 1.
Figure 3:
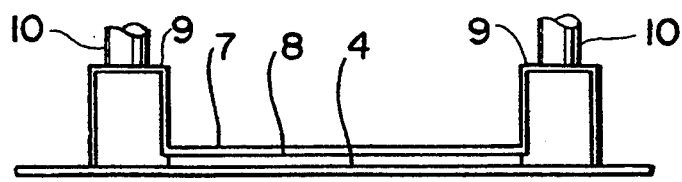
FIG. 3 shows a section A—A of FIG. 1.

In FIG. 2, the chamber wall 4 has ribs 6 welded onto the side of the generator, which are closed off with a cover wall 7. This forms conduit-like cooling pockets 8, through which the medium of the secondary cooling loop flows. To secure the cover wall 7 to the ribs 6, the cover wall has bores at the fastening points, so that the cover wall 7 can be welded to the ribs 6. For delivery or removal of the secondary cooling medium, the cooling pockets 8 communicate via collecting conduits 9, which are provided with inlets and outlets 10.

Figure 4:
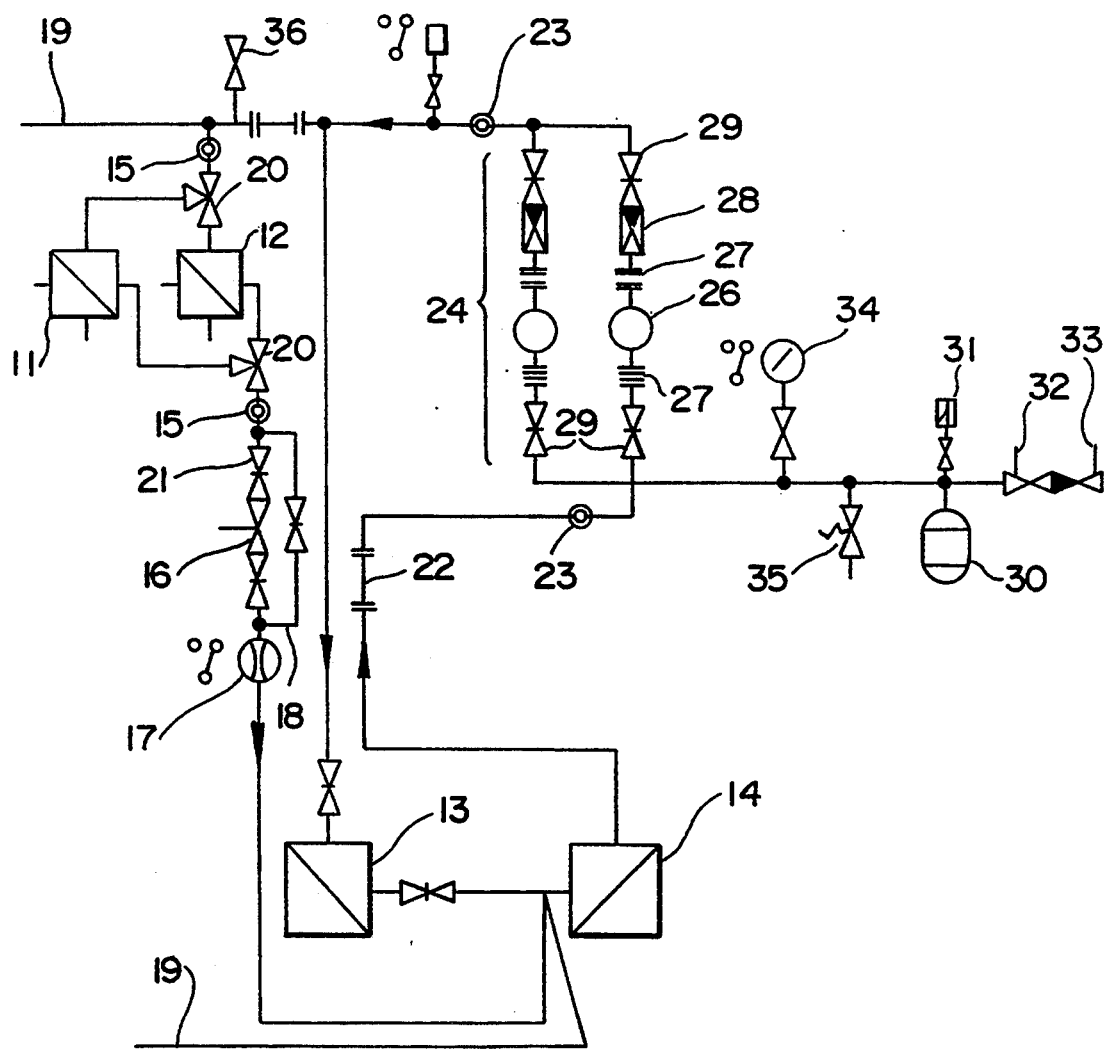
FIG. 4 is the cooling system diagram.

As shown in FIG. 4, the generator cooling air, on the one hand, and the bearing or transmission oil, on the other, are re-cooled with this cooling system. For cooling the gearing oil or transmission oil, the oil/water coolers 11, 12 are provided, and the air/water cooler 13 is provided for cooling the generator air. The secondary cooling loop is in turn cooled in the double jacket cooler of the cooling radiators 14 (illustrated in FIG. 1 as cooling radiators 14, and in FIG. 4 as heat exchangers 14).

Upstream and downstream of the oil/water coolers 11, 12 are three-way cocks 20, each of which is followed by a location 15 for measuring the temperature. A diaphragm slide 21, a temperature regulator 16 and a flow monitor 17 are also built into the line from the oil/water coolers 11, 12 to the cooling radiators 14. The diaphragm slide 21 and the temperature regulator 16 can be bypassed via a bypass line 18. A regulator coolant loop 19, having a radiator 37 therein, can also be superimposed on this coolant loop.

With its secondary circuit, in which a valve is disposed, the air/water cooler 13 communicates on the one hand directly with the cooling radiators 14. On the other hand this secondary circuit is closed via a measuring segment 22, downstream of which is a location 23 for measuring the pressure, and the coolant pump circuit 24, which may have an identical parallel circuit, a further pressure measuring location 23 with a pressure switch 25, and a valve.

The coolant pump 26 is both preceded and followed by a respective compensator 27. A check valve 28 and a diaphragm slide 29 are also provided. An expansion vessel 30 with an automatic ventilation valve 31 and a shutoff valve 32 and check valve 33 is also provided. This circuit is monitored by a contact manometer 34 and an overpressure valve 35.

The cooling system is completed with the filling valve 36.

What is claimed is:

1. A cooling system for a generator positioned in a chamber and surrounded by running water and having a turbine, comprising:
   a primary coolant loop having a primary coolant therein for cooling the generator, and
   a secondary coolant loop having a secondary coolant therein for re-cooling the primary coolant in a heat exchanger present in the secondary coolant loop, said secondary coolant loop comprising an oil/water cooler and an air/water cooler, means for flowing said secondary coolant through both said oil/water cooler and said air/water cooler, said secondary coolant loop further comprising cooling radiators formed on a wall of said chamber, for cooling said secondary coolant.

2. The cooling system according to claim 1, further comprising a transmission positioned between said generator and said turbine.

3. The cooling system according to claim 1, wherein said chamber wall comprises metal.

4. The cooling system according to claim 1, wherein said heat exchanger comprises said air/water cooler for cooling generator air, and said oil/water cooler for cooling at least one member selected from the group consisting of bearing oil and transmission oil.

5. The cooling system according to claim 1, wherein:
   said chamber wall is flushed on an outside surface thereof by running water, and
   said chamber wall has a sheet-metal jacket comprising at least one member selected from the group consisting of vertical and horizontal conduit-like cooling pockets on a side of said generator.

6. The cooling system of claim 4, wherein:
   said chamber wall is flushed on an outside surface thereof by running water, and
   said chamber wall has a sheet-metal jacket comprising at least one member selected from the group consisting of vertical and horizontal conduit-like cooling pockets on a side of said generator.

7. The cooling system according to claim 6, wherein said cooling pockets are connected to one another by collecting conduits.

8. The cooling system according to claim 5, wherein said cooling pockets comprise ribs welded onto said chamber wall, and are closed off by a cover wall.

9. The cooling system according to claim 6, wherein said cooling pockets comprise ribs welded onto said chamber wall, and are closed off by a cover wall.

10. The cooling system according to claim 7, wherein said cooling pockets comprise ribs welded onto said chamber wall, and are closed off by a cover wall.

11. The cooling system according to claim 10, wherein said cover wall has recesses therein, and is welded to said ribs, and said recesses are filled with welding material.

12. The cooling system according to claim 10, wherein said recesses are bores.

* * * * *